United States Patent [19]

Herm et al.

[11] Patent Number: 5,558,203
[45] Date of Patent: Sep. 24, 1996

[54] TRANSPORTING DEVICE

[75] Inventors: Hartmut Herm, Dreieich; Karl May, Bad Vilbel; Karlheinz Unverzagt, Offenbach am Main; Helmut Werdinig, Nürnberg, all of Germany

[73] Assignee: Siemens Aktiengesellschaft, Munich, Germany

[21] Appl. No.: 411,458

[22] Filed: Mar. 28, 1995

Related U.S. Application Data

[63] Continuation of PCT/DE93/00877, Sep. 16, 1993.

[30] Foreign Application Priority Data

Sep. 29, 1992 [DE] Germany ............................ 42 32 684.2

[51] Int. Cl.⁶ .................................................. B65G 33/26
[52] U.S. Cl. ............................................. 198/661; 198/671
[58] Field of Search ..................................... 198/660, 661, 198/671; 414/218

[56] References Cited

U.S. PATENT DOCUMENTS

| | | |
|---|---|---|
| 3,115,276 | 12/1963 | Johanningmeier . |
| 3,360,824 | 1/1968 | Schippers ............................ 198/661 X |
| 3,504,400 | 4/1970 | Natov et al. ........................... 198/661 |
| 3,593,844 | 7/1971 | Barclay et al. . |
| 3,841,465 | 10/1974 | Miller, Jr. et al. . |
| 3,896,923 | 7/1975 | Griffith . |
| 4,036,411 | 7/1977 | Westhoff . |
| 4,128,160 | 12/1978 | Deal et al. . |
| 4,391,561 | 7/1983 | Smith et al. ........................ 198/661 X |
| 4,881,862 | 11/1989 | Dick ..................................... 198/671 X |
| 5,101,961 | 4/1992 | Bengtson et al. . |

FOREIGN PATENT DOCUMENTS

| | | |
|---|---|---|
| 0130954 | 1/1985 | European Pat. Off. . |
| 0302310 | 8/1990 | European Pat. Off. . |
| 2655302 | 6/1978 | Germany . |
| 3526841 | 2/1986 | Germany . |
| 3545339 | 7/1987 | Germany . |
| 9206908.0 | 9/1992 | Germany . |
| 141151 | 7/1953 | Sweden . |
| 201148 | 2/1939 | Switzerland . |
| 772949 | 10/1980 | U.S.S.R. . |
| 848440 | 7/1981 | U.S.S.R. . |
| 443372 | 2/1936 | United Kingdom . |
| 509721 | 7/1939 | United Kingdom . |
| 569370 | 5/1945 | United Kingdom . |
| 576688 | 4/1946 | United Kingdom . |
| 850699 | 10/1960 | United Kingdom . |
| 1394039 | 5/1975 | United Kingdom . |
| 1544550 | 4/1979 | United Kingdom . |
| 1594543 | 7/1981 | United Kingdom . |
| 8203615 | 10/1982 | WIPO ................................ 198/661 |
| 8504837 | 11/1985 | WIPO . |

OTHER PUBLICATIONS

Japanese Patent Abstract No. JP 58–17006 (Sumino) Jul. 22, 1981.

*Primary Examiner*—James R. Bidwell
*Attorney, Agent, or Firm*—Herbert L. Lerner; Laurence A. Greenberg

[57] ABSTRACT

A transporting device includes a housing having a feed opening and a discharge opening defining a transporting direction. The housing has a partial section and a remaining section. A conveyor worm is disposed in the housing, is rotatable about a longitudinal axis and has a smaller pitch in the partial section than in the remaining section. The smaller pitch of the conveyor worm is disposed at a distance from the feed opening, as seen in the transporting direction.

11 Claims, 3 Drawing Sheets

5,558,203

1

TRANSPORTING DEVICE

CROSS-REFERENCE TO RELATED APPLICATION

This application is a Continuation of International Application Serial No. PCT/DE93/00877, filed Sep. 16, 1993.

BACKGROUND OF THE INVENTION

1 Field of the Invention

The invention relates to a transporting device having a conveyor worm being rotatable about its longitudinal axis, being disposed in a housing having a feed opening and a discharge opening and having a smaller pitch in one partial section of the housing than in a remaining region.

Such transporting devices are known and they are used for various types of substances.

Known transporting devices are frequently only filled to three-quarters of their capacity in order to avoid clogging.

U.S. Pat. No. 3,896,923 discloses a transporting device which includes a conveyor worm having a pitch increasing from the feed opening in the transporting direction. The part of the conveyor worm which transports the most slowly is thus located in the region of the feed opening. At a distance from the feed opening, the pitch of the conveyor worm is larger than in the region of the feed opening. The material being fed-in is thus transported more quickly when it moves away from the feed opening than at the feed opening. As a result, the formation of a stopper is prevented.

Where a transporting device is to be used to convey the material to be transported into a reaction space, it may be a requirement that no air should make its way into the reaction space through the transporting device and/or that no gas should leave the reaction space through the transporting device. A reaction space of that kind can be the low-temperature carbonization drum of a thermal waste disposal plant known from European Patent No. 0 302 310 B1. Waste of different types, e.g. reduced-size domestic rubbish, small-sized industrial waste, but also, in part, solidified slurry, in that case is fed by the transporting device to the low-temperature carbonization drum. The low-temperature carbonization operation in the low-temperature carbonization drum can be disrupted by a sudden increase in the supply of atmospheric oxygen, since the low-temperature carbonization procedure has to proceed sub-stoichiometrically. On the other hand, the low-temperature carbonization gas generated in the low-temperature carbonization device is intended to be fed through a low-temperature carbonization gas pipe to a combustion chamber. No low-temperature carbonization gas must be allowed to flow back through the transporting device and therefore make its way into the environment.

A transporting device through which no gas can flow during operation can be derived from United Kingdom Patent Specification No. 569 370. In that case, the conveyor worm does not extend over the entire length of its housing, so that a stopper is formed out of the transported material. The stopper can prevent any flow of gas in the housing. However, by virtue of the fact that in some sections there is no conveyor worm present, that can result in the transporting device clogging up in such a section.

In order to provide a good transportation of the material, it is necessary that the material to be transported should not stick to the conveyor worm. In order to achieve that, it is customary for rails to be disposed in the housing, on its wall, which protrude into the interspace between the conveyor worm and the housing. Whenever the conveyor worm rotates, material to be transported is stripped from the conveyor worm by the rails. Such rails are subject to high wear and tear.

SUMMARY OF THE INVENTION

It is accordingly an object of the invention to provide a transporting device, which overcomes the hereinafore-mentioned disadvantages of the heretofore-known devices of this general type, which always ensures that no gaseous substances, such as air or low-temperature carbonization gas, can flow through it and which nevertheless cannot be clogged up.

With the foregoing and other objects in view there is provided, in accordance with the invention, a transporting device, comprising a housing having a feed opening and a discharge opening defining a transporting direction, the housing having a partial section and a remaining section; and a conveyor worm being disposed in the housing, being rotatable about a longitudinal axis and having a smaller pitch in the partial section than in the remaining section, the smaller pitch section of the conveyor worm being disposed at a distance from the feed opening, as seen in the transporting direction.

The material to be transported is compressed in the partial section having the smaller pitch. As a result of this compression, the material is forced towards the walls of the housing, thereby resulting in a largely gas-tight sealing of the housing in this partial section. Consequently, no atmospheric oxygen can make its way from outside, through the transporting device, into a reaction space, e.g. into a low-temperature carbonization drum of a low-temperature carbonization combustion plant. Moreover, no gas generated in the reaction space, e.g. low-temperature carbonization gas, can make its way out of the reaction space, e.g. the low-temperature carbonization drum, counter to the direction of transport, through the transporting device into the environment. Advantageously, the transporting device according to the invention is always gas-tight. Furthermore, any clogging of the transporting device, even though it is sealed gas-tight, is largely precluded by the fact that the conveyor worm is formed in one piece and extends over the entire housing.

In accordance with another feature of the invention, a partial element of the conveyor worm which has a smaller pitch can be disposed between two partial elements having a larger pitch. The compressed bulk of the material which seals the transporting device in this case is located in an inner section of the transporting device.

In accordance with a further feature of the invention, the conveyor worm has a gap within the housing. In the region of this gap, the material is not moved onwards by a conveyor worm. The material being advanced through a first partial element of the conveyor worm which is located before the gap initially piles up within the gap, the effect of which is that the material fills the whole of the free space within the gap right up to the housing wall. Therefore, a gas-tight seal is formed there too. As a result of the material which is being constantly fed-in behind, the compressed bulk of the material moves through the gap and is broken down and transported away by a second partial element of the conveyor worm which is located behind the gap, while on the opposite side of the gap, the compressed bulk is supplemented. The bulk of the material within the gap is constantly in motion, although it is compressed in such a way that the transporting device is always sealed gas-tight.

In accordance with an added feature of the invention, the conveyor worm ends in the housing at a distance before the discharge opening. As in the previously illustrated example, a compressed material zone is formed during operation, and the zone is broken down on the outlet side, while being supplemented by the conveyor worm. The difference from the previous example can be seen in the fact that a gas-tight seal of the transporting device is disposed close to the outlet of the housing, instead of in an inner section.

In accordance with an additional feature of the invention, there is provided a by-pass space between the conveyor worm and its housing.

By virtue of the fact that the transporting device is completely filled with the material to be transported, at least in certain sections, for the formation of a gas-tight seal, the compressed material could stick so strongly to the conveyor worm that it could rotate with the conveyor worm. Onward transportation would then no longer be possible and the material would remain in the transporting device. In order to prevent the material from rotating jointly with the conveyor worm, the by-pass space is present between the conveyor worm and the housing. This space is formed by the fact that from the longitudinal axis of the conveyor worm perpendicular to the longitudinal axis, as measured in the outward direction, between the greatest radius of the conveyor worm and the housing wall, a differently sized distance is left free in dependence upon the direction in which the measurements are taken. This advantageously ensures that the transported material is able from time to time to detach itself from the conveyor worm, so that it does not rotate with the conveyor worm.

Advantageously, no rails need be fitted to the inner wall of the housing, as was previously conventional, in order to prevent the material from rotating with the conveyor worm. Whereas such rails are subject to a high degree of wear, the transporting device according to the invention is able to operate in a largely wear-free manner.

In accordance with yet another feature of the invention, to form the by-pass space, the housing has, for example, a circular cross-section and the longitudinal axis of the conveyor worm is disposed in the housing eccentrically to the longitudinal axis of the housing.

In accordance with yet a further feature of the invention, the housing has a trough-shaped cross-section having a lower, semi-circular part and an upper, rectangular part.

In accordance with yet an added feature of the invention, the housing has a polygonal cross-section. This polygonal cross-section can be a trough-shaped cross-section having a lower, polygonal part and an upper, rectangular part.

All of these embodiments have the effect of preventing the material to be transported from rotating with the conveyor worm.

In accordance with yet an additional feature of the invention, the conveyor worm, in the region of the feed opening, is configured conically and has a diameter which increases in the direction of transport.

In accordance with again another feature of the invention, there is provided a fall shaft above the feed opening, to which a fill level gauge assigned. The embodiment in which the conveyor worm is configured conically and has a diameter that increases in the direction of transport in the region of the feed opening, is of particular importance in this case. Should the conveyor worm exhibit a constant cross-section over its entire length, the material to be transported would exhibit a surface which ascends in the direction of transport in the fall shaft, while the device is in operation. A reliable fill level measurement would then not be possible. The conical configuration of the worm section located beneath the fall shaft ensures that the material in the fall shaft always has a largely horizontal surface. This is attributable to the fact that beneath the feed opening in the direction of transport an increasingly large amount of material is transported away. As a result, a fill level measurement is only now possible.

The particular advantage of the device according to the invention is that no gaseous substances are able to flow through the transporting device. Both an air-flow in the direction of transport and a gas-flow in the opposite direction are precluded. Moreover, any cloggings of the transporting device are largely avoided.

In accordance with a concomitant feature of the invention, a low-temperature carbonization drum is connected to the discharge opening.

Other features which are considered as characteristic for the invention are set forth in the appended claims.

Although the invention is illustrated and described herein as embodied in a transporting device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
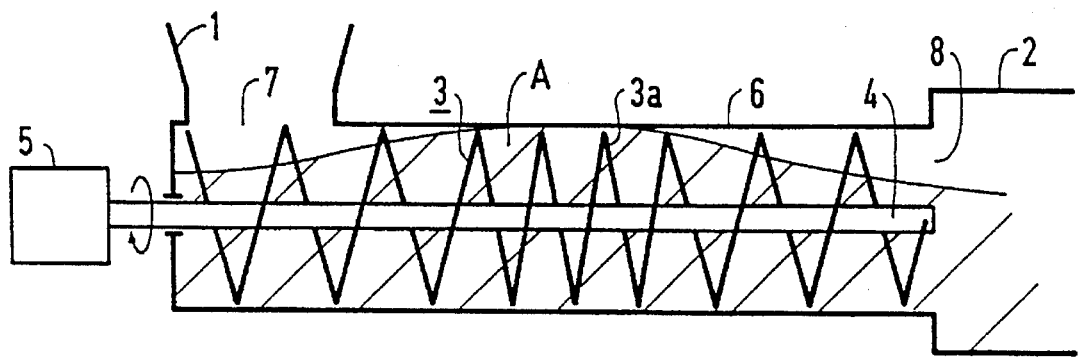
FIG. 1 is a fragmentary, diagrammatic, sectional view of a transporting device having a conveyor worm having a partial element having a lower pitch.
Figure 2:
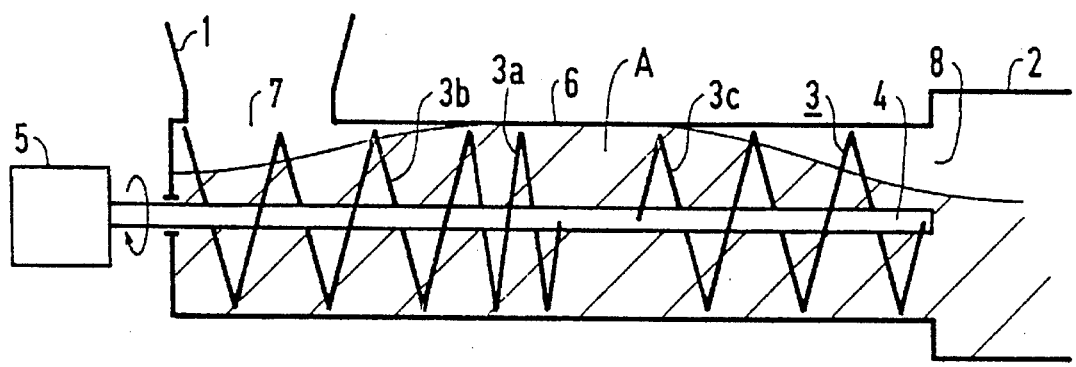
FIG. 2 is a view similar to FIG. 1 of a transporting device having a conveyor worm which additionally has a gap.
Figure 3:
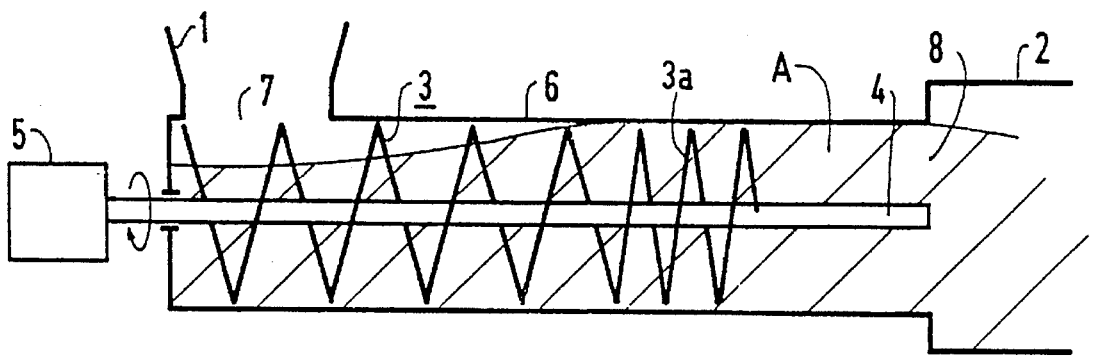
FIG. 3 is another view similar to FIG. 1 of a transporting device having a conveyor worm which ends at a distance before a discharge opening.

Referring now to the figures of the drawing in detail and first, particularly, to FIGS. 1, 2 and 3 thereof, there is seen a conveyor worm 3 for transporting a material A, for example for transporting waste from a fall shaft 1 to a low-temperature carbonization drum 2, which can be a component part of a low-temperature carbonization combustion plant. The conveyor worm 3 is rotatable about its longitudinal axis and for this purpose it is disposed on an axle or shaft 4, which can be rotated by a motor 5. The conveyor worm 3 is disposed in a housing 6 having at least one opening for the passage of the axle or shaft 4 as well as a feed opening 7 and a discharge opening 8 for the material A. The fall shaft 1 can be joined to the housing 6 at the feed opening 7. The low-temperature carbonization drum 2 can be connected to the housing 6 at the discharge opening 8. The material A which is filled through the feed opening 7 into the housing 6 is conveyed by the rotating conveyor worm 3 to the discharge opening 8 and there it is discharged.

In certain applications, for example in the transportation of waste from the fall shaft 1 to the low-temperature carbonization drum 2, it is necessary to ensure that atmospheric oxygen should not make its way from the feed opening 7 to the low-temperature carbonization drum 2, and that low-temperature carbonization gas should not make its way out of the low-temperature carbonization drum 2, in counter-flow to the transported waste, through the feed opening 7 into the environment.

According to FIGS. 1 to 3, in order to prevent a flow of gas through the transporting device, one partial element 3a of the conveyor worm 3 has a smaller pitch than the rest of the conveyor worm 3. The effect of this is that the transported material A is compressed more strongly in the region of this partial element 3a than elsewhere, which results in an entire partial space in the housing 6 being filled by the material A in the region of the partial element 3a of the conveyor worm 3. There, the transported material A itself seals the housing 6 gas-tight. Air cannot flow from the feed opening 7 to the discharge opening 8, nor can low-temperature carbonization gas flow in the opposite direction.

According to FIG. 1, as is seen in the direction of transport, the conveyor worm 3 again has a larger pitch behind a compression zone which is located in the region of the partial element 3a of the conveyor worm 3. The material A has a packing which extends over the entire cross-section of the housing 6 and is thereby broken up again. No clogging can result in the transporting device which would prevent the transportation of the material A.

According to FIG. 2, a gap is additionally provided in the conveyor worm 3. The partial element 3a is connected to a partial element 3b, and the gap remains free between the partial element 3a and a partial element 3c of the conveyor worm 3. The partial element 3a has a smaller pitch than the partial elements 3b and 3c. The transported material A is pushed by the partial elements 3b and 3a of the conveyor worm 3 into the gap, where it accumulates and fills the entire cross-section of the housing 6. This packing being formed of the transported material A is broken down by the partial element 3c of the conveyor worm 3, as the material A is continuously fed-in behind by the partial element 3b. The housing 6 is thereupon particularly well sealed gas-tight by the transported material A by virtue of the combination of the partial element 3a and the gap. The gap may also be disposed between the partial element 3b and the partial element 3a, which has a smaller pitch.

The transporting device according to FIG. 3 differs from that according to FIG. 2 by the fact that that section in the housing 6 in which there is no conveyor worm 3 is not disposed in the middle of the housing 6 but rather at the outlet-side end of the housing 6. The conveyor worm 3 according to FIG. 3 ends with the partial element 3a, which has a smaller pitch than the remaining conveyor worm 3, at a distance before the discharge opening 8. Therefore, a packing is formed between the end of the conveyor worm 3 and the discharge opening 8. The packing is formed of the transported material A and fills the entire cross-section of the housing 6. By virtue of the combination of the partial element 3a and the section without the conveyor worm 3, the housing 6 is particularly well sealed gas-tight by the transported material A. As further material A is fed-in behind by the conveyor worm 3, the seal-tight packing breaks off in pieces at the discharge opening 8. In this way, the material A makes its way through the discharge opening 8 out of the housing 6.

In order to be able to seal the housing 6 gas-tight by means of the transported material A, the device must be operated at high throughput. In order to prevent relatively large parts of the material A from blocking or clogging the conveyor worm 3, particularly in the transportation of waste, a by-pass space 9a–d for relatively large parts of this kind is provided according to FIGS. 4 to 7. Whenever the conveyor worm 3 rotates, the relatively large parts to be transported are forced into the by-pass space 9a–d, so that they are unable to block the conveyor worm 3. The by-pass space 9a–d is generally located above or to the side of the conveyor worm 3.

Figure 4:
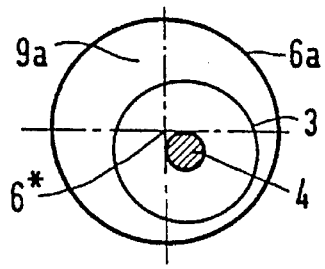
FIG. 4 is a sectional view of a transporting device having a circular housing cross-section and an eccentrically disposed conveyor worm.

According to FIG. 4, the housing 6a has a circular cross-section and the axle or shaft 4 of the conveyor worm 3 is disposed in the housing 6a eccentrically to the longitudinal axis 6 * of the housing 6a. In this way, a by-pass space 9a is obtained above the conveyor worm 3.

Figure 5:
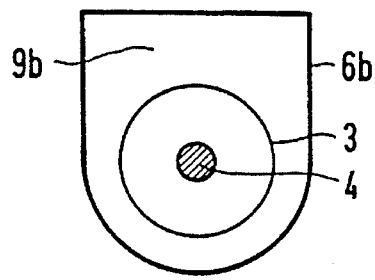
FIG. 5 is a sectional view of a transporting device having a trough-shaped housing.

According to FIG. 5, a by-pass space 9b is obtained by virtue of a trough-shaped housing 6b having a lower, semi-circular and an upper, rectangular part.

Figure 6:
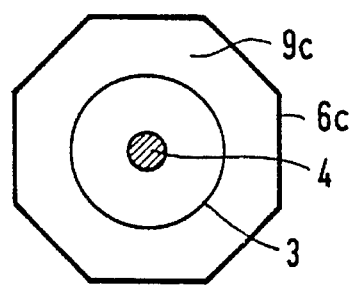
FIG. 6 is a sectional view of a transporting device having a housing which has a polygonal cross-section.

According to FIG. 6, a housing 6c having a polygonal cross-section is provided. In this case, by-pass spaces 9c are obtained in the region of the housing edges.

Figure 7:
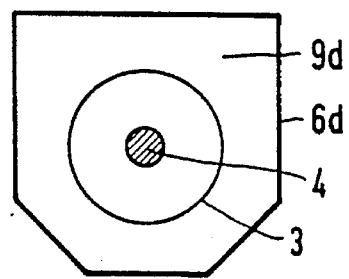
FIG. 7 is a sectional view of a transporting device having a trough-shaped housing which has a polygonal cross-section.

The housing 6d according to FIG. 7 is a combination of the shapes of the housings 6b and 6c. The cross-section of the housing 6d is formed by a lower, polygonal part and an upper, rectangular part. By-pass spaces 9d are then obtained in the region of the edges of the housing 6d.

Figure 8:
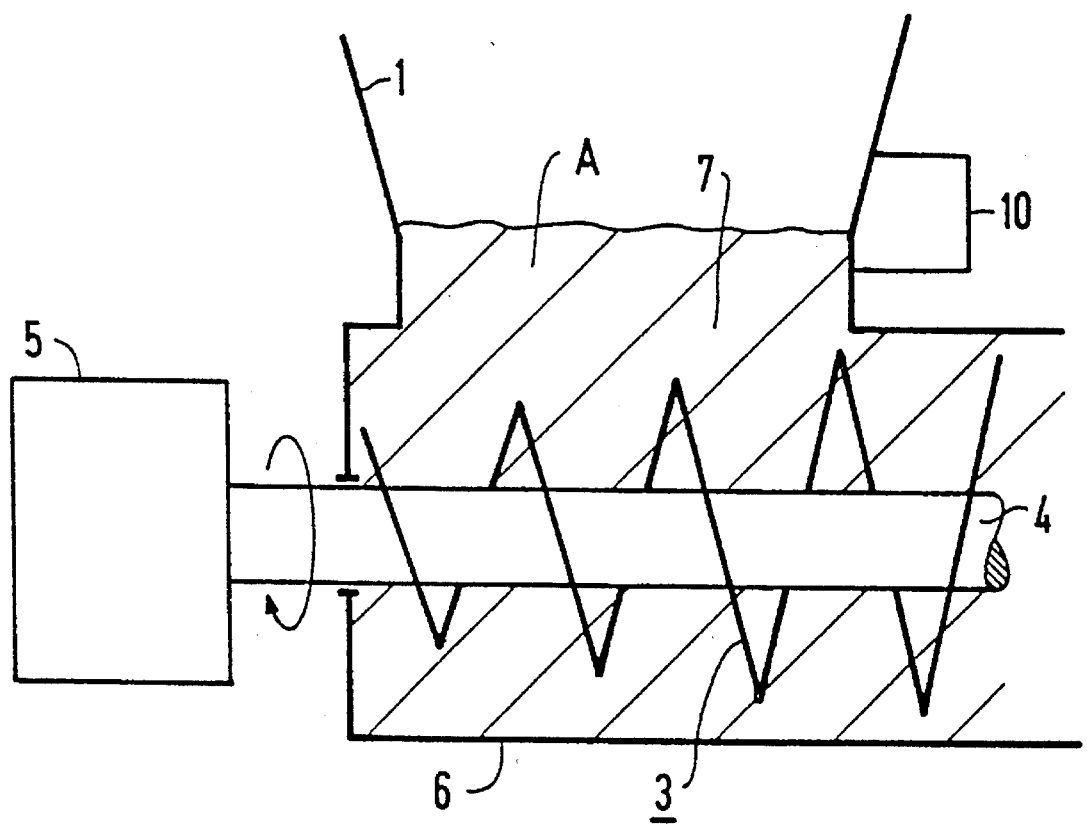
FIG. 8 is an enlarged view similar to FIG. 1 of a transporting device having a conveyor worm which is configured conically in the region of a feed opening.

According to FIG. 8, the conveyor worm 3 is conically configured beneath the feed opening 7 and has a diameter which increases in the direction of transport. Beneath the feed opening 7, as viewed in the direction of transport, an increasingly large amount of material A is thereby transported away. The result is that the fed-in material A always has a horizontal surface in the fall shaft 1 above the feed opening 7. It is only then that the fill level in the fall shaft 1 can be reliably measured by means of a fill level gauge 10.

The transporting device according to the invention is made gas-tight solely by virtue of the transported material A. Furthermore, the conveyor worm 3 itself is reliably prevented from being able to be blocked by relatively large parts in the transported material A. Finally, according to FIG. 8, a fill level measurement in the fall shaft 1 is possible.

We claim:

1. A transporting device, comprising:

a housing having a feed opening and a discharge opening defining a transporting direction, said housing having a partial section and a remaining section;

a conveyor worm being disposed in said housing, being rotatable about a longitudinal axis and having a smaller pitch in said partial section than in said remaining section, said smaller pitch of said conveyor worm being disposed at a distance from said feed opening, as seen in the transporting direction; and said conveyor worm having a partial element with said smaller pitch and two partial elements with a larger pitch, said partial element with said smaller pitch being disposed between said two partial elements with said larger pitch.

2. The transporting device according to claim 1, including a fall shaft for waste being connected to said feed opening.

3. The transporting device according to claim 1, wherein said conveyor worm has a gap formed therein within said housing.

4. The transporting device according to claim 1, wherein said conveyor worm ends at a distance before said discharge opening within said housing.

5. The transporting device according to claim 1, wherein said conveyor worm and said housing define a by-pass space therebetween.

6. The transporting device according to claim 1, including a low-temperature carbonization drum being connected to said discharge opening.

7. The transporting device according to claim 5, wherein said housing has a trough-shaped cross-section with a lower, semi-circular part and an upper, rectangular part, forming said by-pass space.

8. The transporting device according to claim 5, wherein said housing has a polygonal cross-section, forming said by-pass space.

9. The transporting device according to claim 8, wherein said housing has a trough-shaped cross-section with a lower, polygonal part and an upper, rectangular part, forming said by-pass space.

10. The transporting device according to claim 1, wherein said conveyor worm is conical and has a diameter increasing in the transporting direction, in the vicinity of said feed opening.

11. A transporting device, comprising:

a housing having a feed opening and a discharge opening defining a transporting direction, said housing having a partial section and a remaining section;

a conveyor worm being disposed in said housing, being rotatable about a longitudinal axis and having a smaller pitch in said partial section than in said remaining section, said smaller pitch of said conveyor worm being disposed at a distance from said feed opening, as seen in the transporting direction;

said conveyor worm and said housing defining a by-pass space therebetween; and said housing having a circular cross-section and a longitudinal axis, and said longitudinal axis of said conveyor worm being disposed in said housing eccentrically to said longitudinal axis of said housing, forming said by-pass space.

* * * * *